US011883935B2

(12) United States Patent
Robertson, Jr. et al.

(10) Patent No.: US 11,883,935 B2
(45) Date of Patent: Jan. 30, 2024

(54) ASSEMBLING A SENSOR ASSEMBLY

(71) Applicant: Ford Global Technologies, LLC, Dearborn, MI (US)

(72) Inventors: Michael Robertson, Jr., Garden City, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 17/505,677

(22) Filed: Oct. 20, 2021

(65) Prior Publication Data

US 2023/0118805 A1 Apr. 20, 2023

(51) Int. Cl.
*B25B 27/00* (2006.01)
*B25B 27/14* (2006.01)
*G01S 7/481* (2006.01)

(52) U.S. Cl.
CPC .......... *B25B 27/14* (2013.01); *B25B 27/0035* (2013.01); *G01S 7/4813* (2013.01)

(58) Field of Classification Search
CPC .... B25B 27/14; B25B 27/0035; G01S 7/4813
See application file for complete search history.

(56) References Cited

U.S. PATENT DOCUMENTS

| 9,625,582 | B2 | 4/2017 | Gruver et al. |
| 10,270,950 | B2 | 4/2019 | Avalos et al. |
| 11,052,833 | B2* | 7/2021 | Oba ...................... G03B 29/00 |
| 2020/0247329 | A1* | 8/2020 | Robertson, Jr. ......... B60R 11/00 |
| 2022/0089236 | A1* | 3/2022 | Ohmori ............... B62D 65/005 |

* cited by examiner

*Primary Examiner* — Nirvana Deonauth
(74) *Attorney, Agent, or Firm* — Frank A. MacKenzie; Bejin Bieneman PLC

(57) ABSTRACT

A method for assembling a sensor assembly, the sensor assembly including a cylindrical sensor and a housing, includes inserting the sensor through a circular port in the housing, fixing a concentric gap between the port and the sensor by placing a partially annular tool in the concentric gap, affixing the housing while the tool is in place, and removing the tool after affixing the housing.

20 Claims, 12 Drawing Sheets

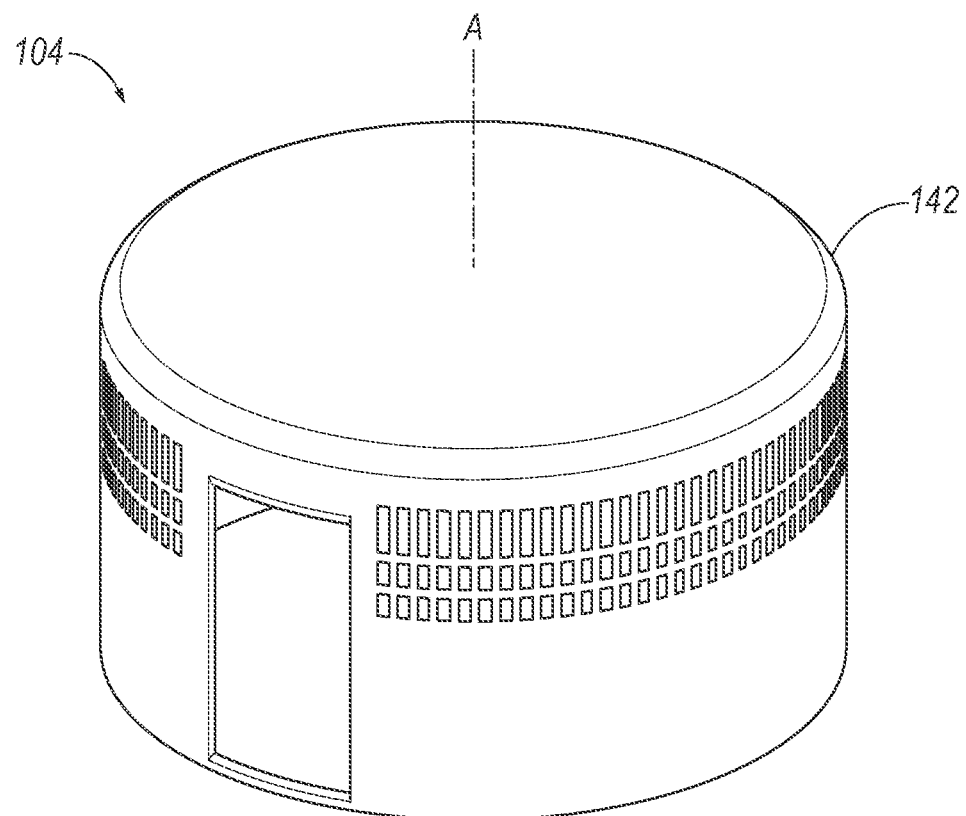
FIG. 3
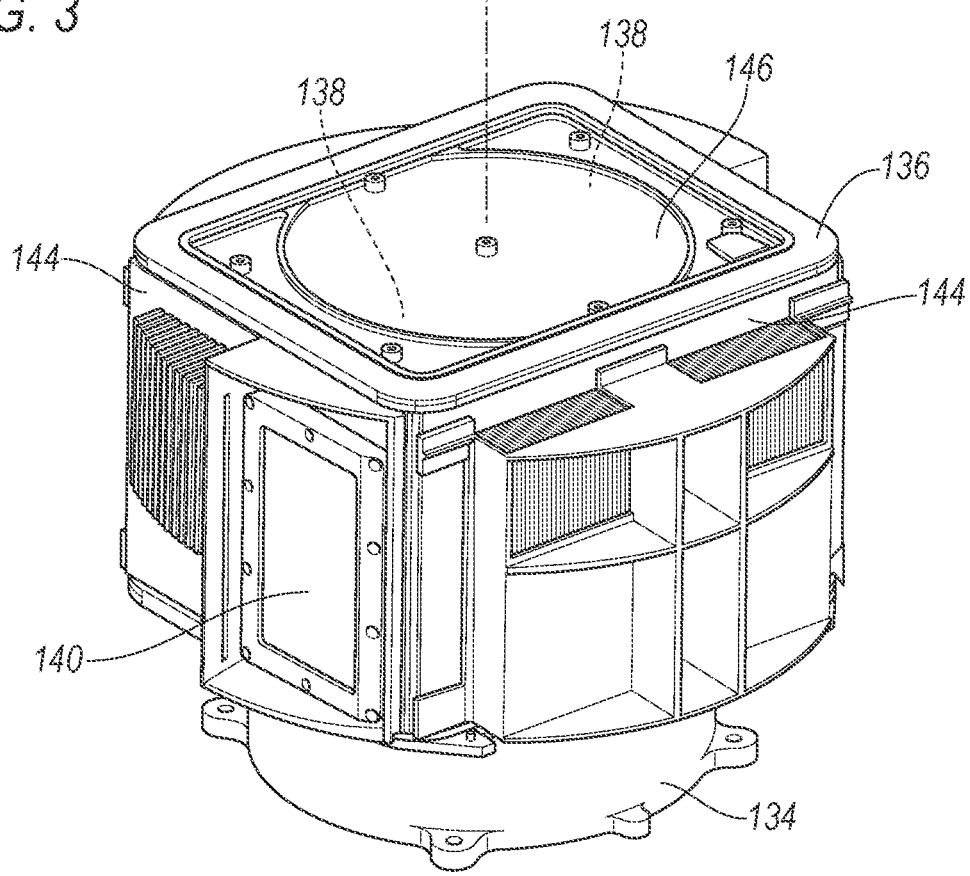

ASSEMBLING A SENSOR ASSEMBLY

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

BRIEF DESCRIPTION OF THE DRAWINGS

FIG. 3 is an exploded perspective view of a sensor of the sensor assembly.

DETAILED DESCRIPTION

Figure 1:
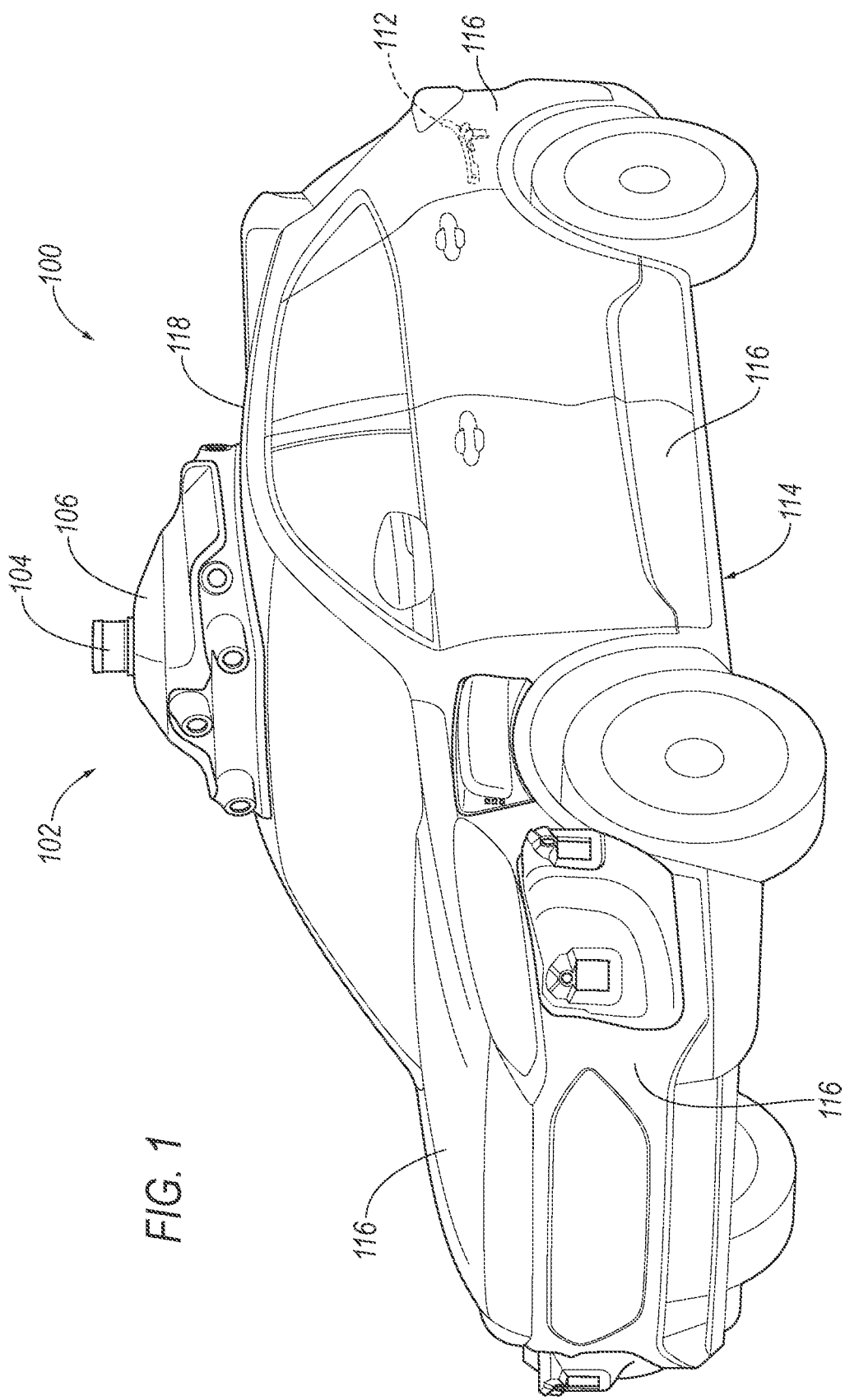
FIG. 1 is a perspective view of an example vehicle with a sensor assembly.

A method for assembling a sensor assembly, the sensor assembly including a cylindrical sensor and a housing, includes inserting the sensor through a circular port in the housing, fixing a concentric gap between the port and the sensor by placing a partially annular tool in the concentric gap, affixing the housing while the tool is in place, and removing the tool after affixing the housing.

The housing may include a recess spaced from the port, and the tool may include a member that fits in the recess while the tool is placed in the concentric gap. The recess may accommodate a fastener, and affixing the housing may include fastening the fastener in the recess. The housing may include a housing lower piece and a housing upper piece, the housing upper piece may include the port and the recess, and fastening the fastener in the recess may attach the housing upper piece to the housing lower piece. The method may further include, before inserting the sensor through the port, attaching the sensor to the housing lower piece, and inserting the sensor through the port may include placing the housing upper piece on the housing lower piece.

The member may have a partial cylindrical shape, and when the tool is placed in the gap, the partial cylindrical shape of the member may be centered on an axis defined by the fastener. The recess may have a partial cylindrical shape matching the partial cylindrical shape of the member. The recess may include a bottom panel including a hole for the fastener, and when the tool is placed in the concentric gap, the member may be spaced from the bottom panel.

The tool may include a partial cylindrical portion, and the member may include a first portion that extends radially outward from the partial cylindrical portion and a second portion that extends axially and fits in the recess when the tool is placed in the concentric gap.

After assembly, the sensor may be rotatable relative to the housing around an axis defined by a cylindrical shape of the sensor.

The tool may have an arc length from 45° to 135°.

The tool may include a partial cylindrical portion, and placing the tool in the concentric gap may include placing the partial cylindrical portion in the concentric gap. The partial cylindrical portion may include a plurality of partial cylindrical extensions that are circumferentially spaced from each other.

The tool may include at least one peg extending radially outward from the partial cylindrical portion, and the peg axially abuts the port when the partial cylindrical portion is in the concentric gap. The tool may include a plurality of pegs including the peg, the pegs may extend radially outward from the partial cylindrical portion, and the pegs may axially abut the port when the partial cylindrical portion is in the concentric gap.

The tool may include a handle extending radially outward from the partial cylindrical portion, and the handle may axially abut the port when the partial cylindrical portion is in the concentric gap.

The housing may include a gutter extending radially inward from the port, and the tool may be spaced from a floor of the gutter when placed in the concentric gap.

The tool may be a first tool, and fixing the concentric gap may include placing a partially annular second tool in the concentric gap on an opposite side of the sensor as the first tool. The first tool and the second tool may have identical shapes.

The method may further include installing a blower in the housing, and the blower may be positioned to generate airflow through the port.

With reference to the Figures, wherein like numerals indicate like parts throughout the several views, a method for assembling a sensor assembly 102, the sensor assembly 102 including a cylindrical sensor 104 and a housing 106, includes inserting the sensor 104 through a circular port 108 in the housing 106, fixing a concentric gap 110 between the port 108 and the sensor 104 by placing a partially annular tool 112 in the concentric gap 110, affixing the housing 106 while the tool 112 is in place, and removing the tool 112 after affixing the housing 106.

The sensor 104 can be rotatable relative to the housing 106. To accommodate the rotation of the sensor 104 relative to the housing 106, the sensor assembly 102 includes the concentric gap 110 between the port 108 and the sensor 104 to help ensure that the sensor 104 does not contact the housing 106 while rotating. Airflow can be provided from the housing 106 to the sensor 104 for cleaning and/or cooling the sensor 104. The concentric gap 110 can permit airflow from the housing 106 to the sensor 104 to escape from the sensor assembly 102, which can reduce the efficiency of cleaning and/or cooling the sensor 104.

The method of assembling the sensor assembly 102 can provide a low dimensional variation for the concentric gap 110. The low dimensional variation can permit a designer to design a small concentric gap 110, which can help minimize the quantity of airflow that escapes through the concentric gap 110 in operation. The efficiency of cleaning and/or cooling the sensor 104 is thus improved.

With reference to FIG. 1, the sensor assembly 102 can be installed on a vehicle 100. The vehicle 100 may be any passenger or commercial automobile such as a car, a truck, a sport utility vehicle, a crossover, a van, a minivan, a taxi, a bus, etc.

The vehicle 100 may be an autonomous vehicle. A computer can be programmed to operate the vehicle 100 independently of the intervention of a human operator, completely or to a lesser degree. The computer may be programmed to operate a propulsion, a brake system, a steering system, and/or other vehicle systems based in part of data received from the sensor 104. For the purposes of this disclosure, autonomous operation means the computer controls the propulsion, brake system, and steering system without input from a human operator; semi-autonomous operation means the computer controls one or two of the propulsion, brake system, and steering system and a human operator controls the remainder; and nonautonomous operation means a human operator controls the propulsion, brake system, and steering system.

The vehicle 100 includes a body 114. The vehicle 100 may be of a unibody construction, in which a frame and the body 114 of the vehicle 100 are a single component. The vehicle 100 may, alternatively, be of a body-on-frame construction, in which the frame supports the body 114 that is a separate component from the frame. The frame and the body 114 may be formed of any suitable material, for example, steel, aluminum, etc.

The body 114 can include body panels 116 partially defining an exterior of the vehicle 100. The body panels 116 may present a class-A surface, e.g., a finished surface exposed to view by a customer and free of unaesthetic blemishes and defects. The body panels 116 can include, e.g., a roof 118, etc.

The sensor assembly 102 includes the housing 106 for the sensor 104 and possibly other sensors. The housing 106 can be attached to the vehicle 100, e.g., to one of the body panels 116 of the vehicle 100, e.g., the roof 118, during or after assembly of the sensor assembly 102. For example, the housing 106 may be shaped to be attachable to the roof 118, e.g., may have a shape matching a contour of the roof 118. The housing 106 may be attached to the roof 118, which can provide the sensor 104 and the other sensors with an unobstructed field of view of an area around the vehicle 100. The housing 106 may be formed of, e.g., plastic or metal.

Figure 2:
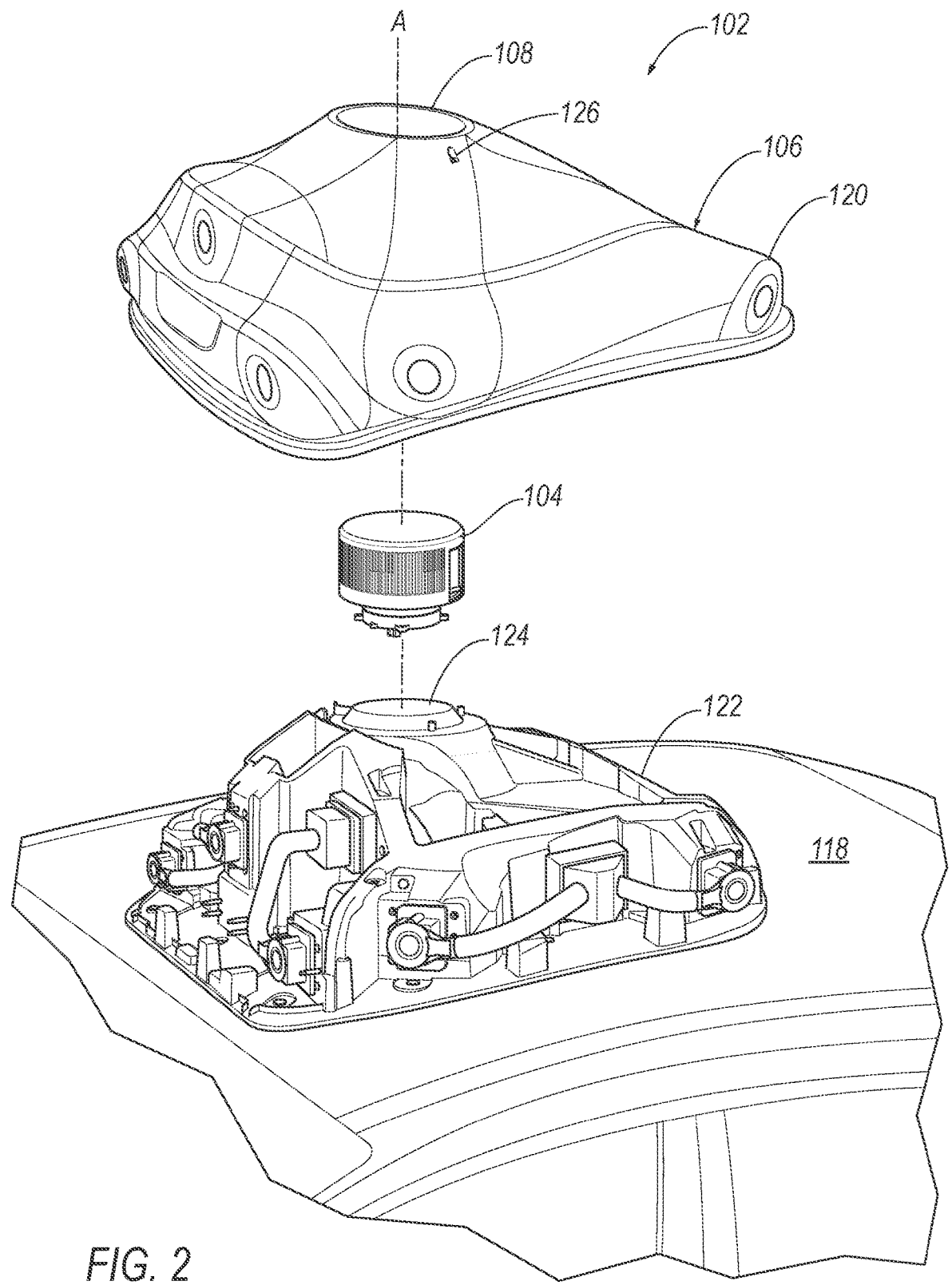
FIG. 2 is an exploded perspective view of the sensor assembly.

With reference to FIG. 2, the housing 106 can include a housing upper piece 120 and a housing lower piece 122. The housing upper piece 120 and the housing lower piece 122 are shaped to fit together, with the housing upper piece 120 fitting on top of the housing lower piece 122. The housing upper piece 120 covers the housing lower piece 122. The housing upper piece 120 includes the port 108 that exposes the housing lower piece 122. The port 108 is round, e.g., has a circular or slightly elliptical shape. The port 108 can define an axis A orthogonal to the port 108 and passing through a geometric center of the port 108.

The housing lower piece 122 includes a platform 124 to which the sensor 104 is mounted. The sensor 104 is supported by and mounted to the housing 106, specifically the housing lower piece 122. The sensor 104 can be disposed on top of the housing 106 at a highest point of the housing 106. The platform 124 is shaped to accept and fix in place the sensor 104, e.g., with a press fit or snap fit. The platform 124 defines an orientation and position of the sensor 104 relative to the body 114 of the vehicle 100. The sensor 104 fits through the port 108 of the housing upper piece 120.

Figure 8:
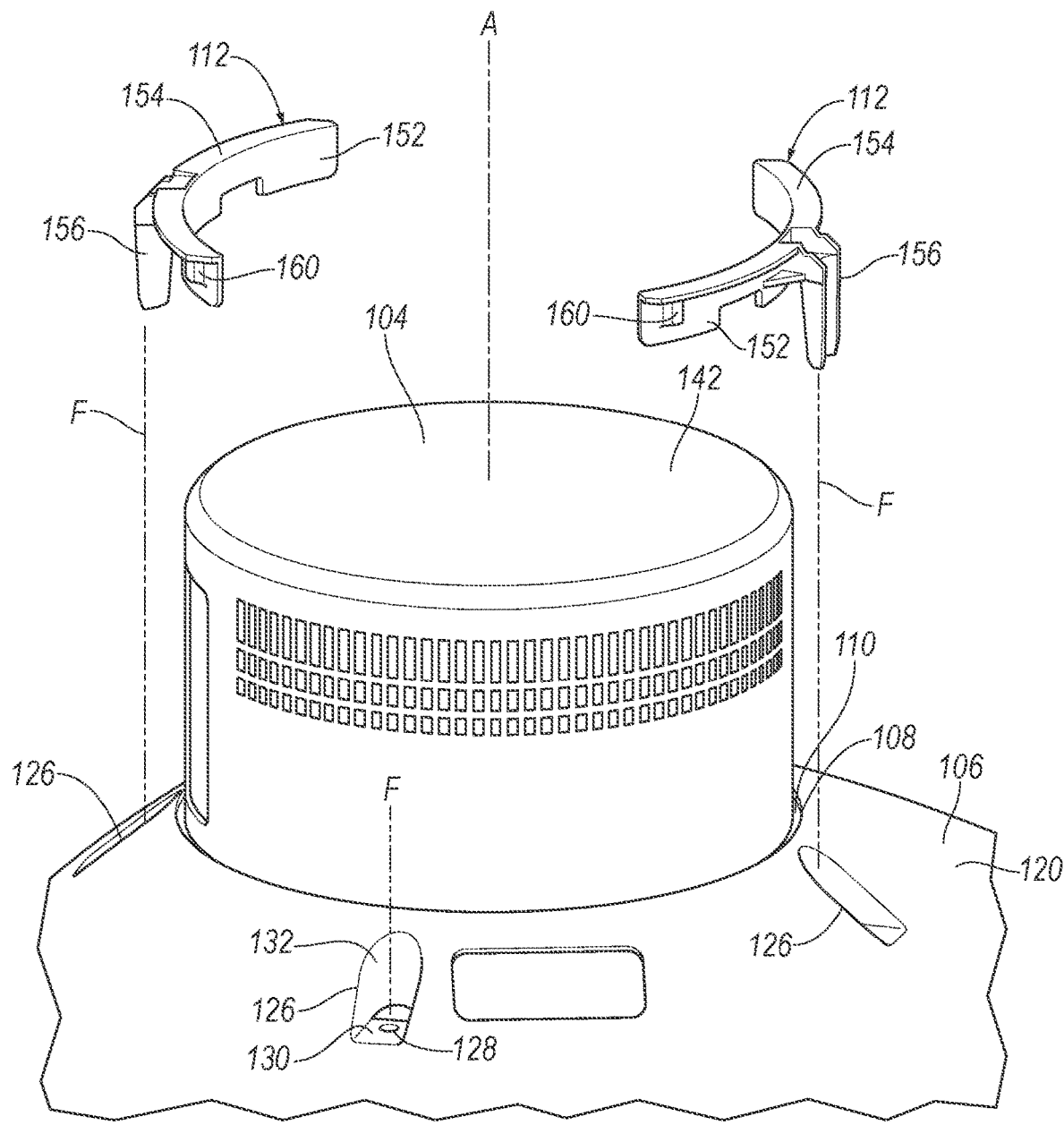
FIG. 8 is a perspective view of the tools being placed for assembling the sensor assembly.
Figure 9:
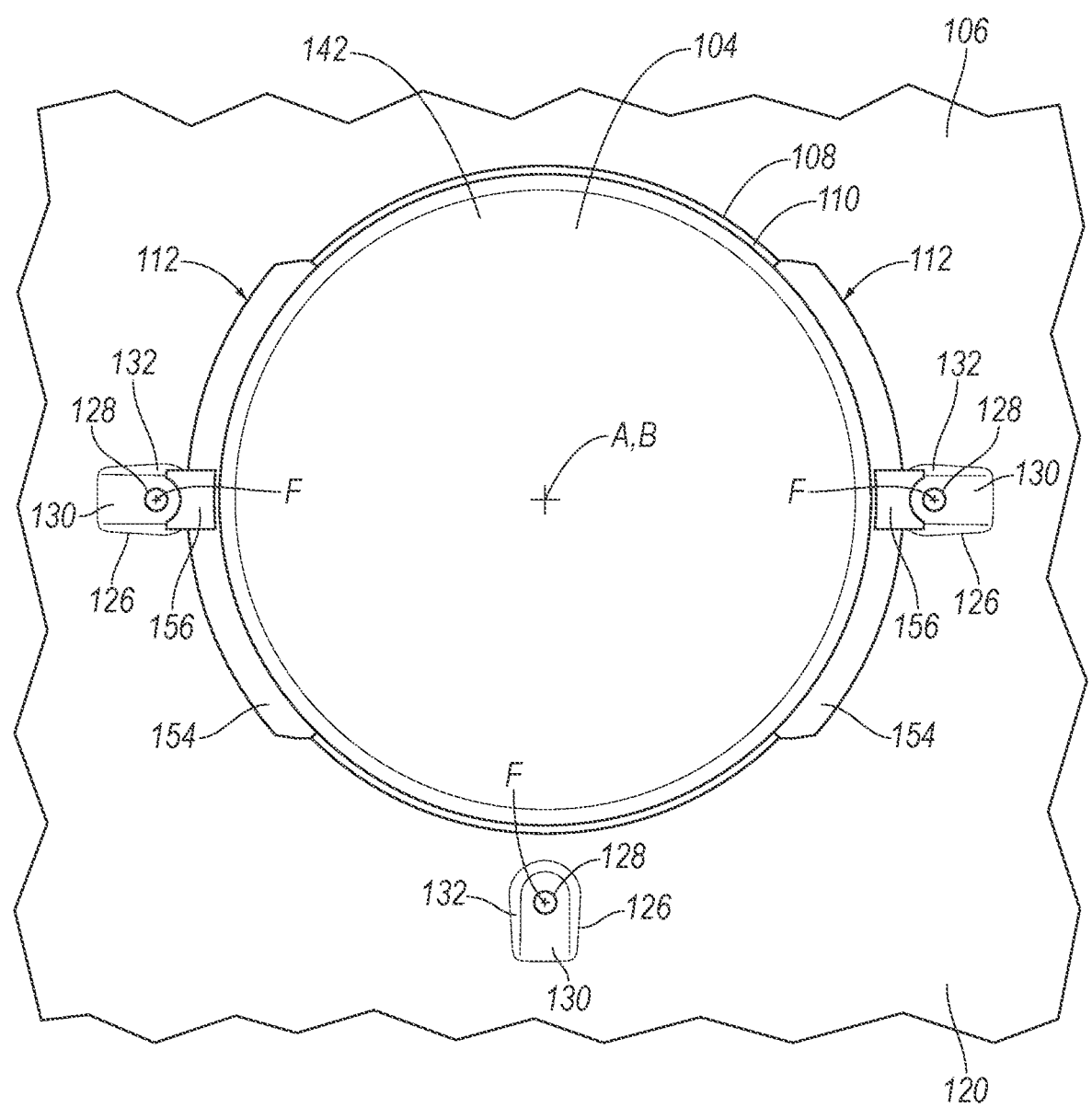
FIG. 9 is a top view of the tools placed for assembling the sensor assembly.

The housing 106, e.g., the housing upper piece 120, includes at least one recess 126, e.g., a plurality of recesses 126. The recesses 126 can be spaced from the port 108. The recesses 126 can be arranged circumferentially around the port 108, as shown in FIGS. 8 and 9. The recesses 126 can each be a same radial distance from the port 108 relative to the axis A defined by the port 108, as shown in FIG. 9.

With reference to FIGS. 8 and 9, each recess 126 can accommodate a respective fastener 128. For example, the recess 126 can have a partial cylindrical shape including a bottom panel 130 and a side panel 132. The bottom panel 130 can be flat and can include a hole for the fastener 128. The fastener 128 when installed can define an axis F on which the hole is centered. The side panel 132 can have a partial-circular cross-section that extends along the axis F defined by the fastener 128.

With reference to FIG. 3, the sensor 104 can include a motor 134, a sensor body 136, at least one sensing device 138, at least one sensor window 140, and a cylindrical shell 142. The motor 134 is attached to and fixed relative to the housing 106, e.g., the housing lower piece 122, e.g., the platform 124. The sensor body 136, the at least one sensing device 138, the at least one sensor window 140, and the cylindrical shell 142 can be fixed relative to each other and can be rotatably drivably coupled to the motor 134.

The motor 134 can be fixed relative to the platform 124 and drivably coupled to the sensor body 136 and thereby drivably coupled to the cylindrical shell 142. The motor 134 can be any suitable type for rotating the sensing device 138, e.g., an electric motor 134. For example, the motor 134 can include a stator (not shown) fixed relative to the housing 106 and a rotor (not shown) rotatable by the stator around the axis A and fixed relative to the sensor body 136.

The sensor body 136 can include walls 144, e.g., four vertical walls 144 as shown in the Figures, and a top surface 146. The walls 144 can have the same horizontal length, i.e., the walls 144 can form a square horizontal cross-section. The horizontal cross-section can be centered on the axis A, i.e., the axis A intersects a geometric center of the horizontal cross-section of the sensor body 136, making the rotation of the sensor body 136 balanced. The top surface 146 extends horizontally to each wall 144. The sensing device 138 is contained inside the sensor body 136. The sensor body 136 is positioned inside the cylindrical shell 142 and fixed relative to the cylindrical shell 142.

The sensor 104 may be designed to detect features of the outside world; for example, the sensor 104 may be a radar sensor, a scanning laser range finder, a light detection and ranging (LIDAR) device, or an image processing sensor such as a camera. In particular, the sensor 104 may be a LIDAR device, e.g., a scanning LIDAR device. A LIDAR device detects distances to objects by emitting laser pulses at a particular wavelength and measuring the time of flight for the pulse to travel to the object and back. The operation of the sensor 104 is performed by the at least one sensing device 138, e.g., a LIDAR sensing device, inside the sensor body 136. For example, the sensor 104 can include two sensing devices 138. The sensing devices 138 have fields of view through the sensor windows 140 encompassing a region from which the sensor 104 receives input. As the sensing devices 138 rotate, the fields of view encompass a horizontal 360° around the vehicle 100.

The sensor 104 can include at least one sensor window 140, e.g., two sensor windows 140, one sensor window 140 for each sensing device 138. The sensor windows 140 are each positioned on one of the walls 144. Each sensor window 140 can be off-center on the respective wall 144. For example, the sensor window 140 can be positioned closer to a trailing edge of the respective wall 144 than a leading edge of the wall 144 with respect to a direction of rotation of the sensor body 136. For example, each sensor window 140 can be positioned in a trailing half of the respective wall 144 with respect to the direction of rotation. The sensor windows 140 can be flat. For example, the sensor windows 140 can have a rectangular shape. The sensor windows 140 are transparent with respect to whatever medium the sensing device 138 is capable of detecting. For example, if the sensor 104 is a LIDAR device, then the sensor windows 140 are transparent with respect to visible light at the wavelength generated and detectable by the sensing devices 138.

The cylindrical shell 142 is fixedly attached to the sensor body 136, e.g., fastened to the top surface 146 of the sensor body 136. The cylindrical shell 142 is rotatable relative to the housing 106 around the axis A defined by the cylindrical shell 142, along with the sensor body 136.

Figure 4:
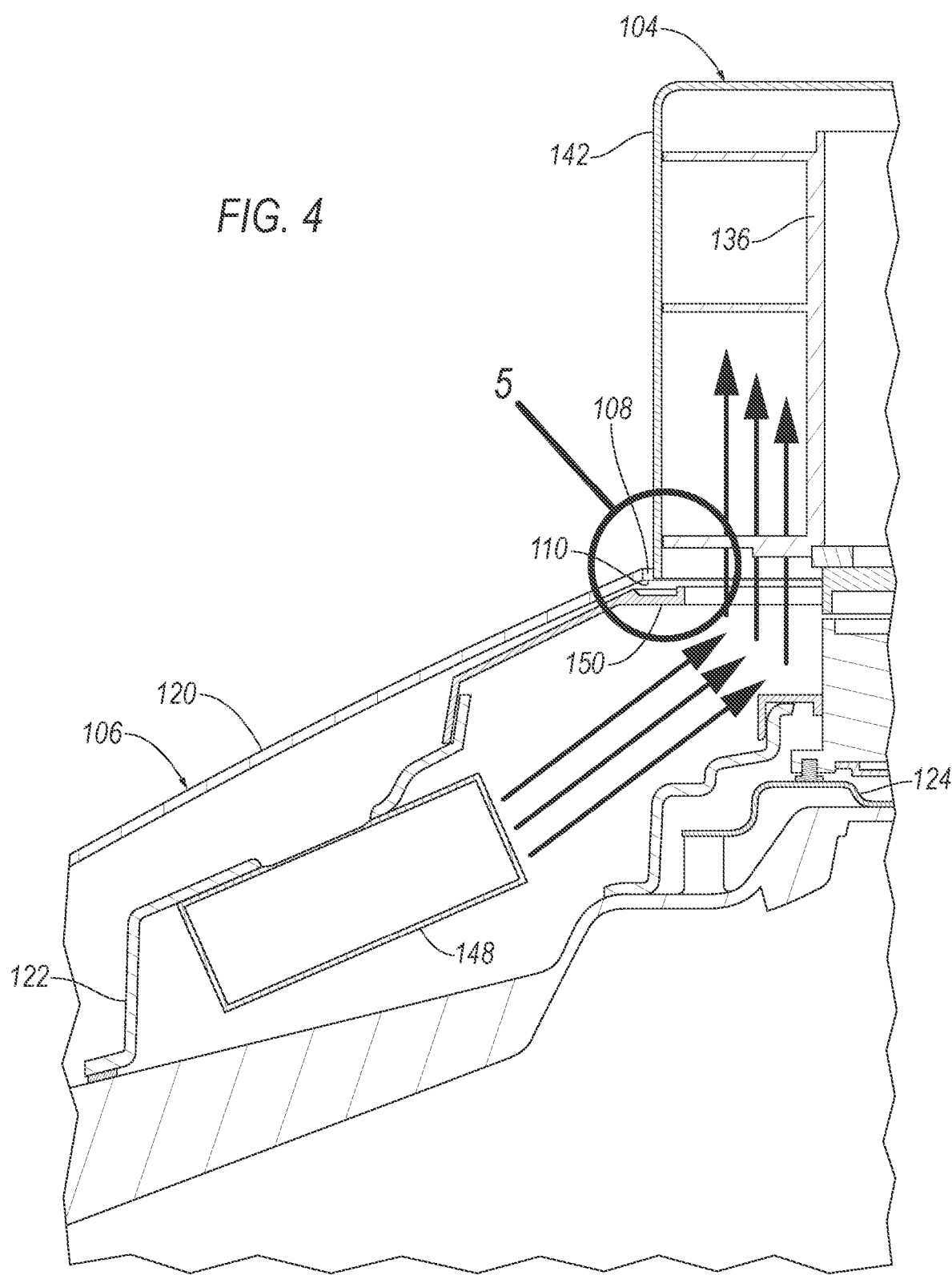
FIG. 4 is a side cross-sectional view of a portion of the sensor assembly.

With reference to FIG. 4, the sensor assembly 102 can include a pressurized-air source 148. The pressurized-air source 148 can be positioned inside the housing 106. The pressurized-air source 148 may be any suitable type of blower, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The pressurized-air source 148 is positioned to generate and discharge airflow through the port 108. For example, the pressurized-air source 148 can be mounted in a space between the housing lower piece 122 and the housing upper piece 120 that is fluidly connected to the port 108. The sensor 104 receives the airflow radially inside a lower edge of the cylindrical shell 142 relative to the axis A. The airflow passes between the sensor body 136 and the cylindrical shell 142. The airflow thus transfers heat from the sensor body 136, thereby cooling the sensor body 136 and the sensing device 138.

Figure 5:
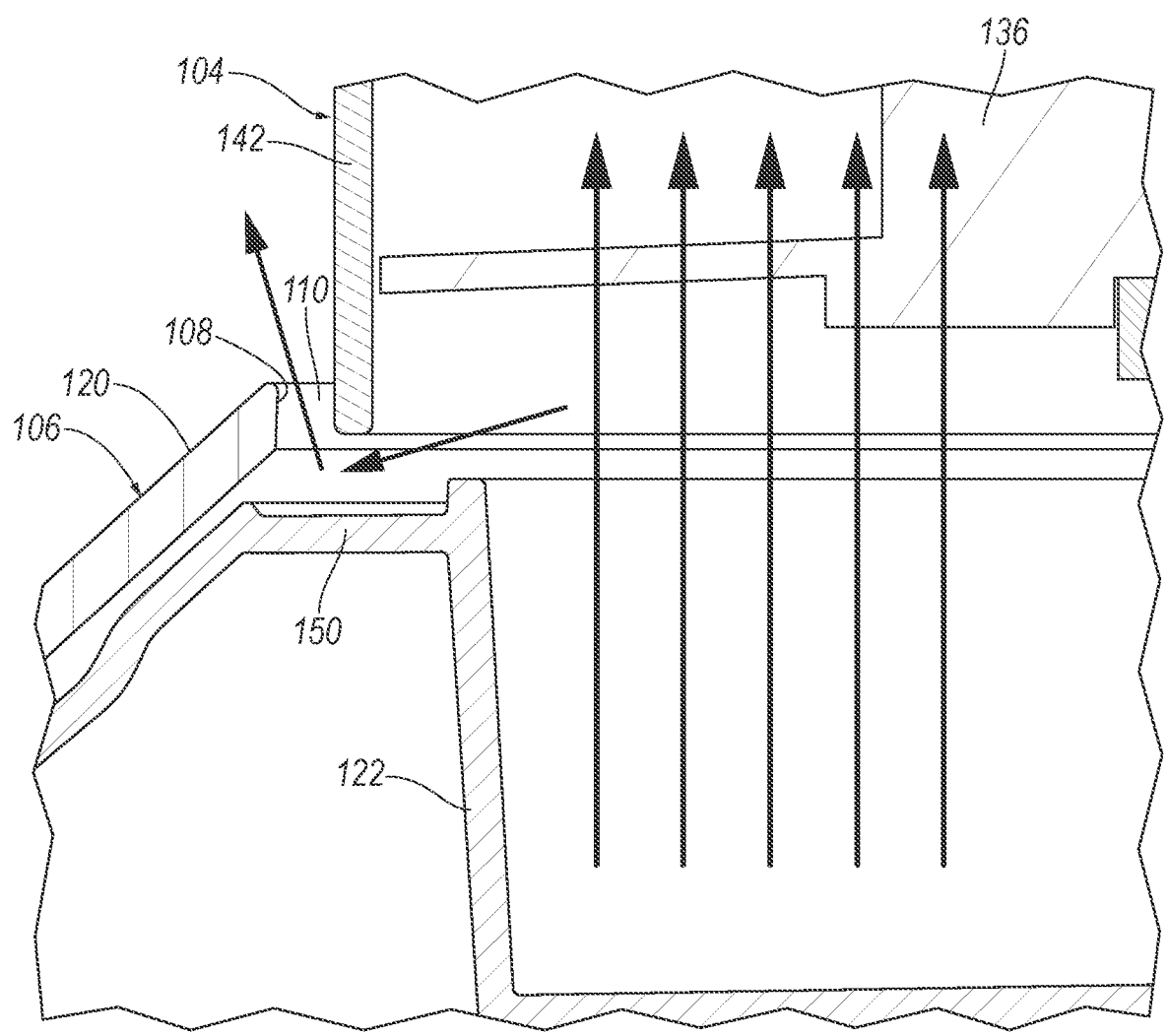
FIG. 5 is an enlarged view of a portion of FIG. 4.

With reference to FIG. 5, the housing 106 can include a gutter 150. The gutter 150 can be elongated along the lower edge of the cylindrical shell 142 once the sensor 104 is installed. The gutter 150 can be positioned directly below the lower edge relative to the axis A, i.e., straight downward. The gutter 150 can have a u- or v-shaped cross-section that follows the lower edge of the cylindrical shell 142. The gutter 150, specifically the cross-section of the gutter 150, extends from radially inside the lower edge to radially outside the lower edge relative to the axis A, as well as from radially inside the port 108 to radially outside the port 108 relative to the axis A. A radially outer edge of the gutter 150 can be flush against a lower surface of the housing upper piece 120 at or radially outside of the port 108 relative to the axis A. The position and shape of the gutter 150 helps the gutter 150 catch fluid, e.g., rain or washer fluid, draining from an outside surface of the cylindrical shell 142.

Figure 6:
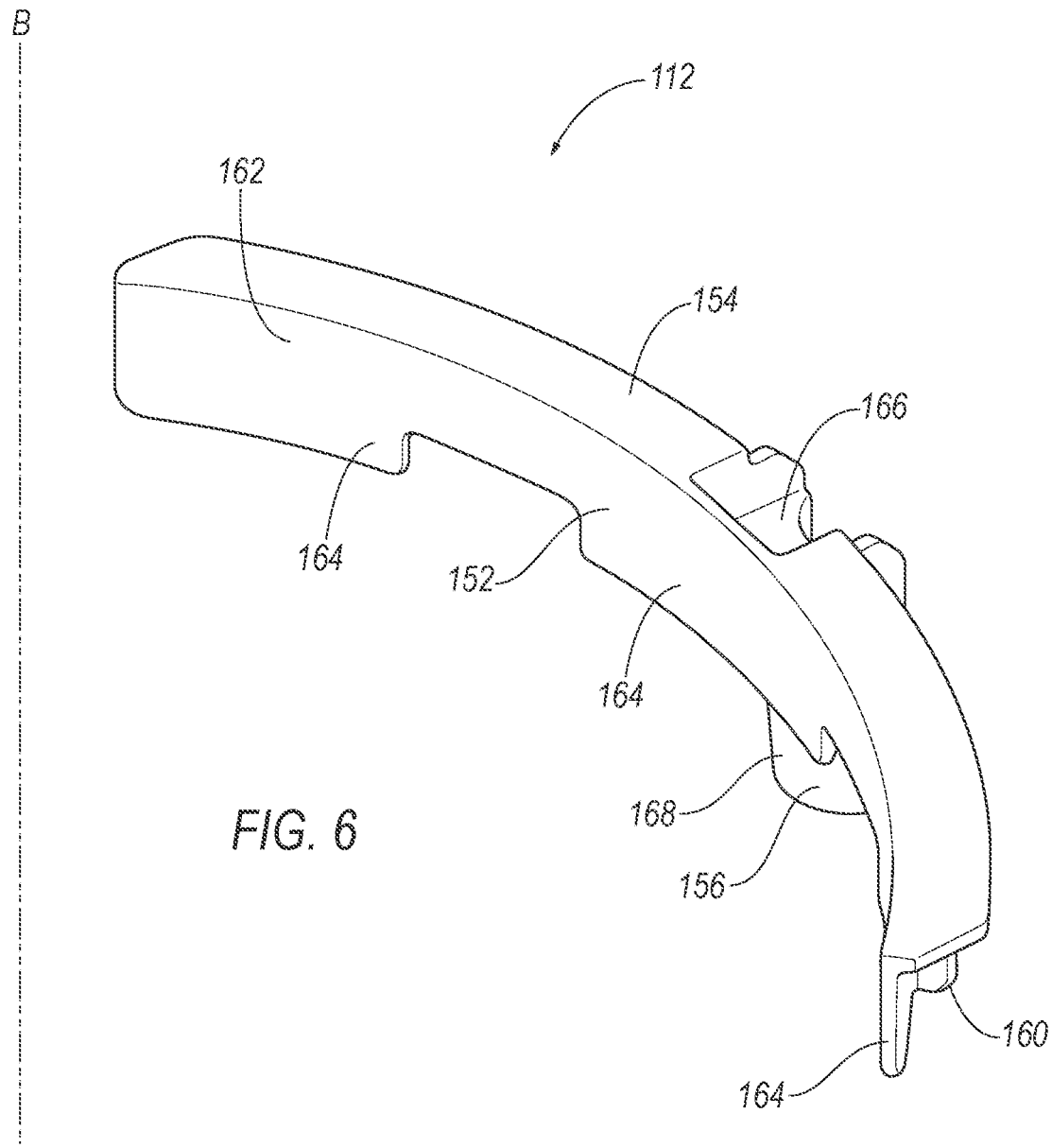
FIG. 6 is a perspective view of a tool for assembling the sensor assembly.
Figure 7:
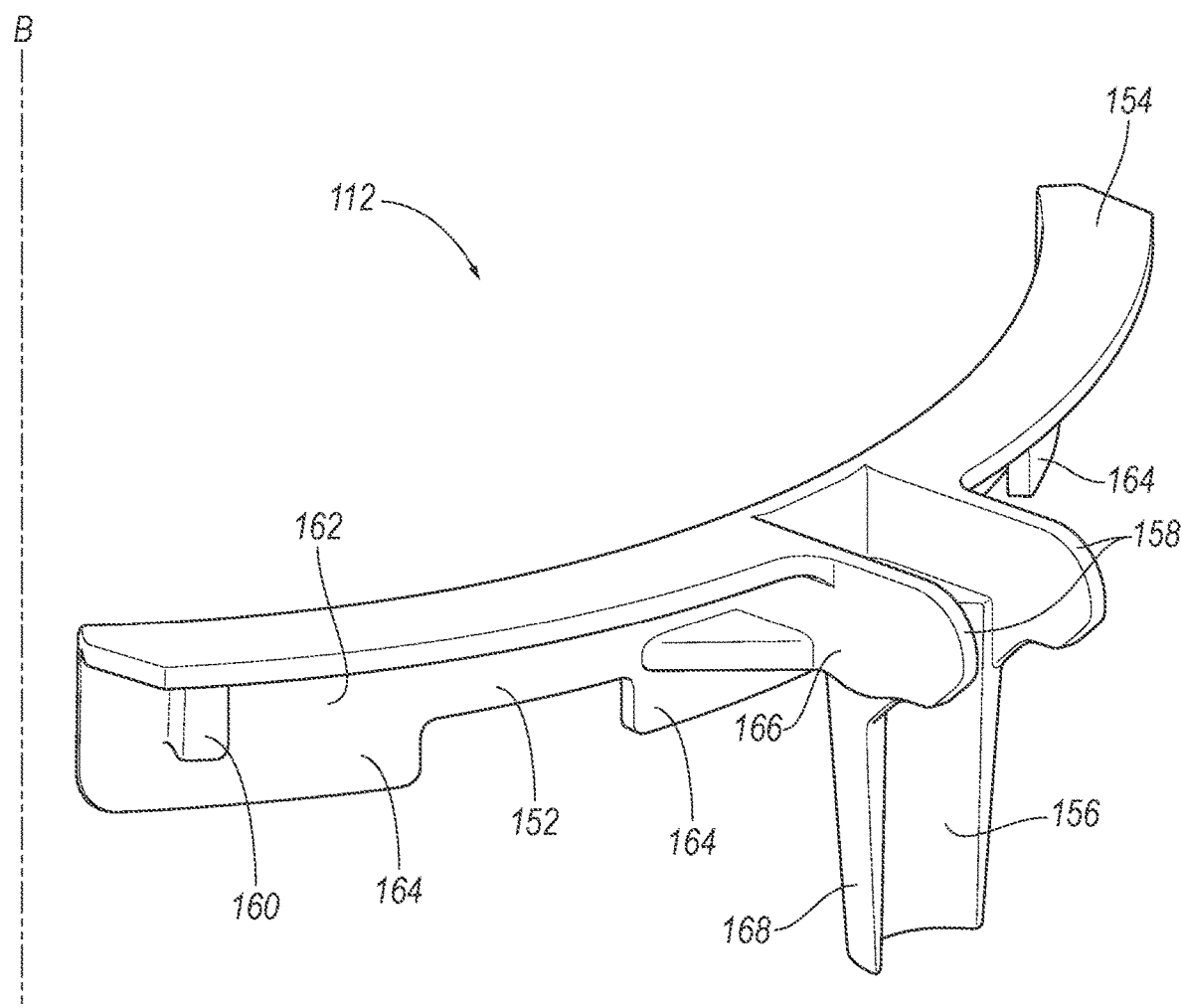
FIG. 7 is a rear perspective view of the tool.

With reference to FIGS. 6 and 7, the tool 112 has a partially annular shape, i.e., a shape extending partway along a circular path. The tool 112 can include a partial cylindrical portion 152, a top panel 154 extending radially outward from the partial cylindrical portion 152, a member 156 extending radially from the partial cylindrical portion 152, a handle 158 extending radially outward from the partial cylindrical portion 152, and at least one peg 160 extending radially outward from the partial cylindrical portion 152.

With reference to FIG. 6, the tool 112 includes the partial cylindrical portion 152. The partial cylindrical portion 152 can extend circumferentially at a constant radial distance from an axis B. The tool 112, e.g., the partial cylindrical portion 152, can have an arc length of approximately 90°, e.g., from 45° to 135°. Such an arc length permits two tools 112 to be used rather than more, as will be described below. The partial cylindrical portion 152 can have a constant radial thickness along an entirety of the arc length, in order to fix the concentric gap 110 at a constant radial width.

The partial cylindrical portion 152 can include a partial cylindrical base 162 and a plurality of partial cylindrical extensions 164 extending axially from the partial cylindrical base 162. The partial cylindrical base 162 and partial cylindrical extensions 164 can collectively have a constant radial thickness. The partial cylindrical extensions 164 can be circumferentially spaced from each other. For example, the partial cylindrical portion 152 can include three partial cylindrical extensions 164 equally spaced from each other.

The tool 112 can include the top panel 154. The top panel 154 can extend radially outward from the partial cylindrical portion 152, e.g., from the partial cylindrical base 162 axially opposite the partial cylindrical extensions 164. The top panel 154 can be flat. The top panel 154 can extend circumferentially from one end of the partial cylindrical portion 152 to an opposite end of the partial cylindrical portion 152.

With reference to FIG. 7, the tool 112 includes the member 156. The member 156 fits in one of the recesses 126 while the tool 112 is placed in the concentric gap 110, as will be described below. The member 156 can include a first portion 166 that extends radially outward from the partial cylindrical portion 152, e.g., the partial cylindrical base 162, and a second portion 168 that extends axially from the first portion 166 in a same direction as the partial cylindrical extensions 164 extend. The first portion 166 of the member 156 can extend from a center of the arc length of the partial cylindrical portion 152. The member 156, e.g., the second portion 168, can have a partial cylindrical shape matching the shape of the recesses 126. The second portion 168 can fit in one of the recesses 126 when the tool 112 is placed in the concentric gap 110.

The tool 112 can include the handle 158. FIG. 6 shows an example of the tool 112 without the handle 158, and FIG. 7 shows an example of the tool 112 with the handle 158. The handle 158 can extend radially outward from the partial cylindrical portion 152, e.g., the partial cylindrical base 162. For example, the handle 158 can form the first portion 166 of the member 156 and can extend farther radially outward than the first portion 166 from the second portion 168. For example, the handle 158 can include two surfaces for a technician to pinch in order to hold the tool 112.

Figure 10:
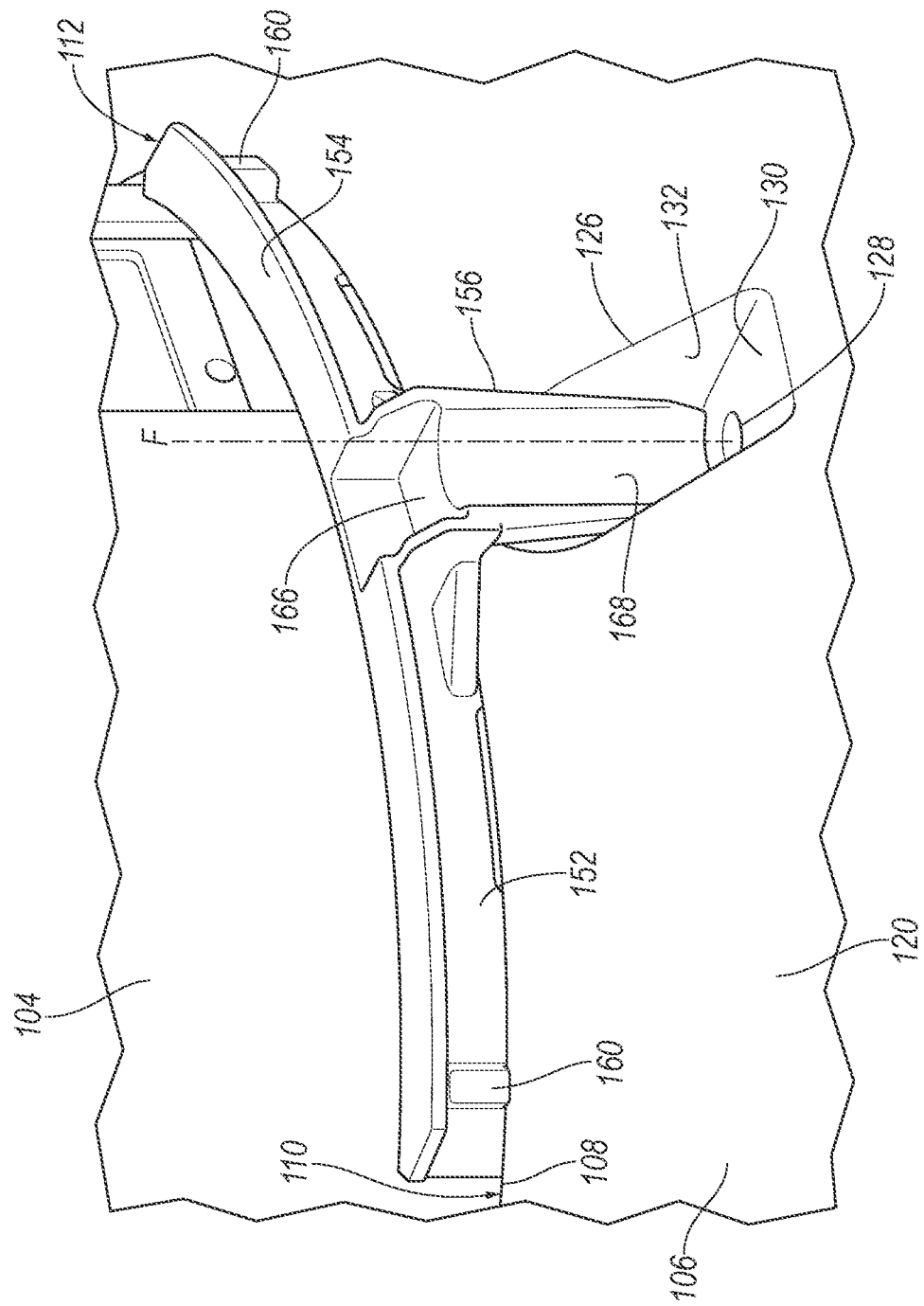
FIG. 10 is a perspective view of the tool placed for assembling the sensor assembly.

The tool 112 includes at least one peg 160, e.g., a plurality of pegs 160. The pegs 160 can extend radially outward from the partial cylindrical portion 152. For example, the tool 112 can include two pegs 160 each located closer to a respective end of the partial cylindrical portion 152 than to a center of the partial cylindrical portion 152, as shown in FIG. 10. The pegs 160 and the first portion 166 of the member 156 can each include bottom surfaces positioned at a same axial position, e.g., a same axial distance from the top panel 154. As described below, the bottom surfaces of the pegs 160 and the first portion 166 of the member 156 rest on the port 108 when the tool 112 is placed in the concentric gap 110, and the wide spacing of the pegs 160 from each other and from the member 156 can help the tool 112 be properly aligned.

Returning to FIG. 2, assembling the sensor assembly 102 can include placing the housing upper piece 120 on the housing lower piece 122. When placing the housing upper piece 120 on the housing lower piece 122, if the sensor 104 is already mounted to the housing lower piece 122, the sensor 104 is thereby inserted through the port 108. The sensor 104 may be approximately but not exactly concentrically centered in the port 108.

With reference to FIG. 8, assembling the sensor assembly 102 can include fixing the concentric gap 110 between the port 108 and the sensor 104 by placing at least one tool 112 in the concentric gap 110. Specifically, the technician can grasp the tool 112 by the handle 158 (or the first portion 166 of the member 156) and arrange the tool 112 so that the partial cylindrical portion 152 is in the concentric gap 110. The plurality of partial cylindrical extensions 164 can make the placement of the tool 112 easier because the partial cylindrical extensions 164 can be placed into the concentric gap 110 one at a time rather than inserting the entire arc length of the partial cylindrical portion 152 in the concentric gap 110 at once, which can be more difficult to properly orient.

With reference to FIGS. 8 and 9, fixing the concentric gap 110 can include placing two tools 112 in the concentric gap 110 on opposite sides of the sensor 104 as each other. The two tools 112 can have circumferential centers that are more than 90°, e.g., approximately 180°, apart. The two tools 112 can have identical shapes matching what is described above. Using two tools 112 with the arc lengths described above that are placed on opposite sides of the sensor 104 can effectively center the sensor 104 within the port 108 while using a minimal number of the tools 112, i.e., two rather than three or four or more.

Figure 11:
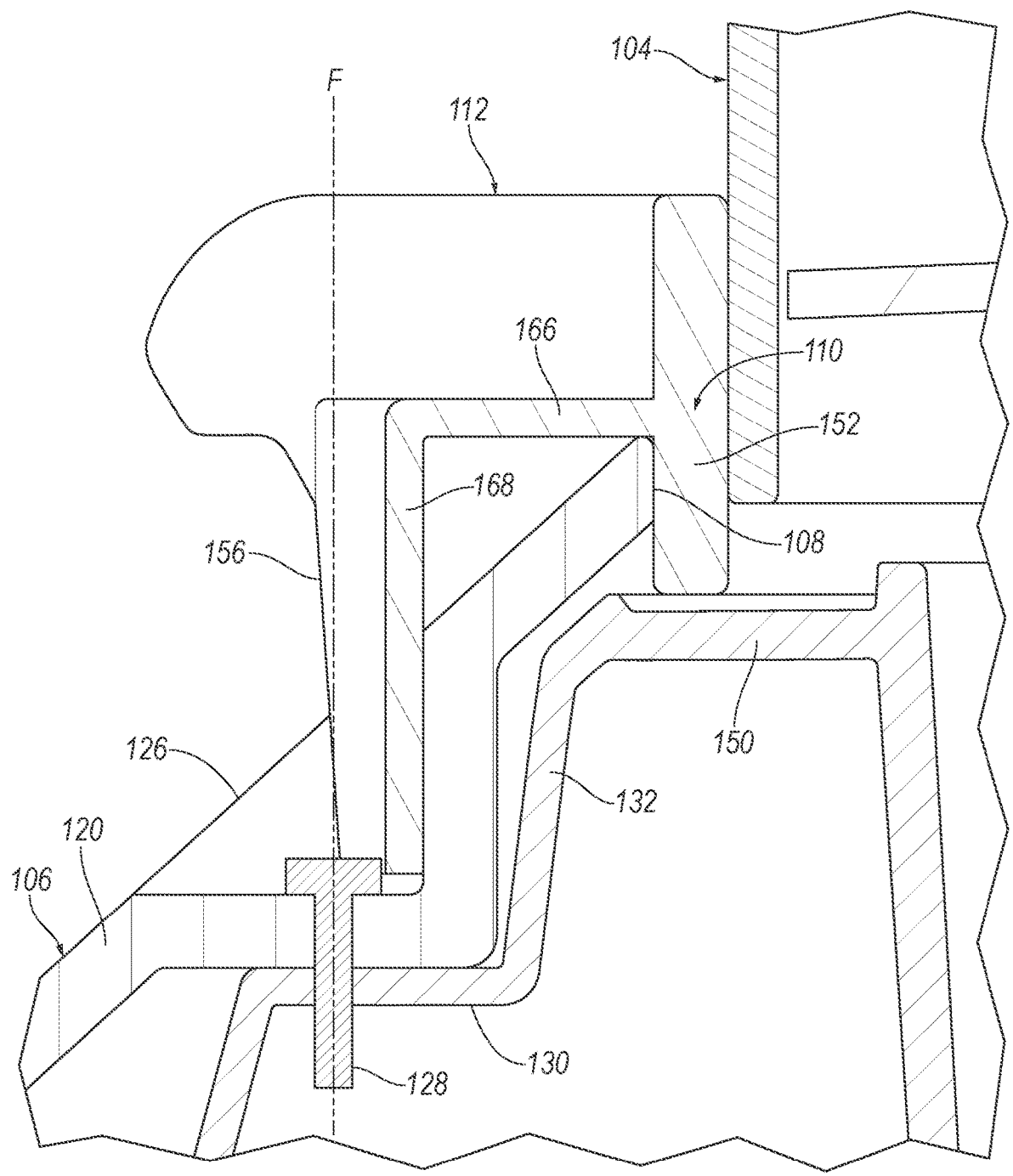
FIG. 11 is a side cross-sectional view of the tool placed for assembling the sensor assembly.

With reference to FIGS. 10 and 11, placing the tool 112 in the concentric gap 110 includes placing the partial cylindrical portion 152 in the concentric gap 110. The tool 112, e.g., the partial cylindrical portion 152, can be spaced from a floor of the gutter 150 when placed in the concentric gap 110, as shown in FIG. 11. When the tool 112 is in the concentric gap 110, a radially outer surface of the partial cylindrical portion 152 can contact the housing 106, a radially inner surface of the partial cylindrical portion 152 can contact the sensor 104, e.g., the cylindrical shell 142, and an axial surface of the partial cylindrical portion 152 can be not contacting anything, e.g., spaced from the housing 106. The radially outer surface and radially inner surface fix the concentric gap 110 at a radial width equal to the radial thickness of the partial cylindrical portion 152, and the axial surface being spaced from the housing 106 helps ensure full insertion of the tool 112 into the concentric gap 110.

When the partial cylindrical portion 152 is in the concentric gap 110, the pegs 160 and/or the handle 158 (or the first portion 166 of the member 156) axially abut the port 108. The bottom surfaces of the pegs 160 and the first portion 166 being at a same axial position can help ensure that the tool 112 is properly aligned in the concentric gap 110. The axial abutment defines full insertion of the tool 112 and provides feedback to the technician that the tool 112 is fully inserted.

Placing the tool 112 in the concentric gap 110 can include fitting the member 156, e.g., the second portion 168 of the member 156, in one of the recesses 126. Fitting the member 156 in the recess 126 can ensure proper circumferential position of the tool 112, can hold the tool 112 fixed in place when the technician releases the handle 158 or the first portion 166, and can help ensure that the radially outer surface of the partial cylindrical portion 152 is properly abutting the port 108. When the tool 112 is placed in the concentric gap 110, the partial cylindrical shape of the member 156 is centered on the axis F defined by the fastener 128, and the second portion 168 mates with the side panel 132 of the recess 126 that matches the partial cylindrical shape of the second portion 168 of the member 156. When the tool 112 is placed in the concentric gap 110, more specifically, is fully inserted, the member 156, e.g., the second portion 168 of the member 156, can be spaced from the bottom panel 130 of the recess 126. The spacing can help ensure that the member 156 does not interfere with full insertion of the tool 112 in the concentric gap 110. The recesses 126 can include recesses 126 located on opposite sides of the sensor 104 for two members 156 of two respective tools 112 to be fitted in the recesses 126, as shown in FIG. 9.

Assembling the sensor assembly 102 can include affixing the housing 106 while the tools 112 are in place in the concentric gap 110. Affixing the housing 106 can include fastening the fasteners 128 in the respective recesses 126. Fastening the fasteners 128 can attach the housing upper piece 120 to the housing lower piece 122. The fasteners 128 fix the relative positions of the housing upper piece 120 and the sensor 104 after the tools 112 are removed from the concentric gap 110.

Assembling the sensor assembly 102 can include removing the tools 112 from the concentric gap 110 after affixing the housing 106. For example, the technician can grasp the tools 112 by the handles 158 or the first portions 166 and lift the tools 112 out of the concentric gap 110. The sensor assembly 102 can then be mounted to the vehicle 100, or assembling the sensor assembly 102 can take place after mounting the housing lower piece 122 to the vehicle 100.

Figure 12:
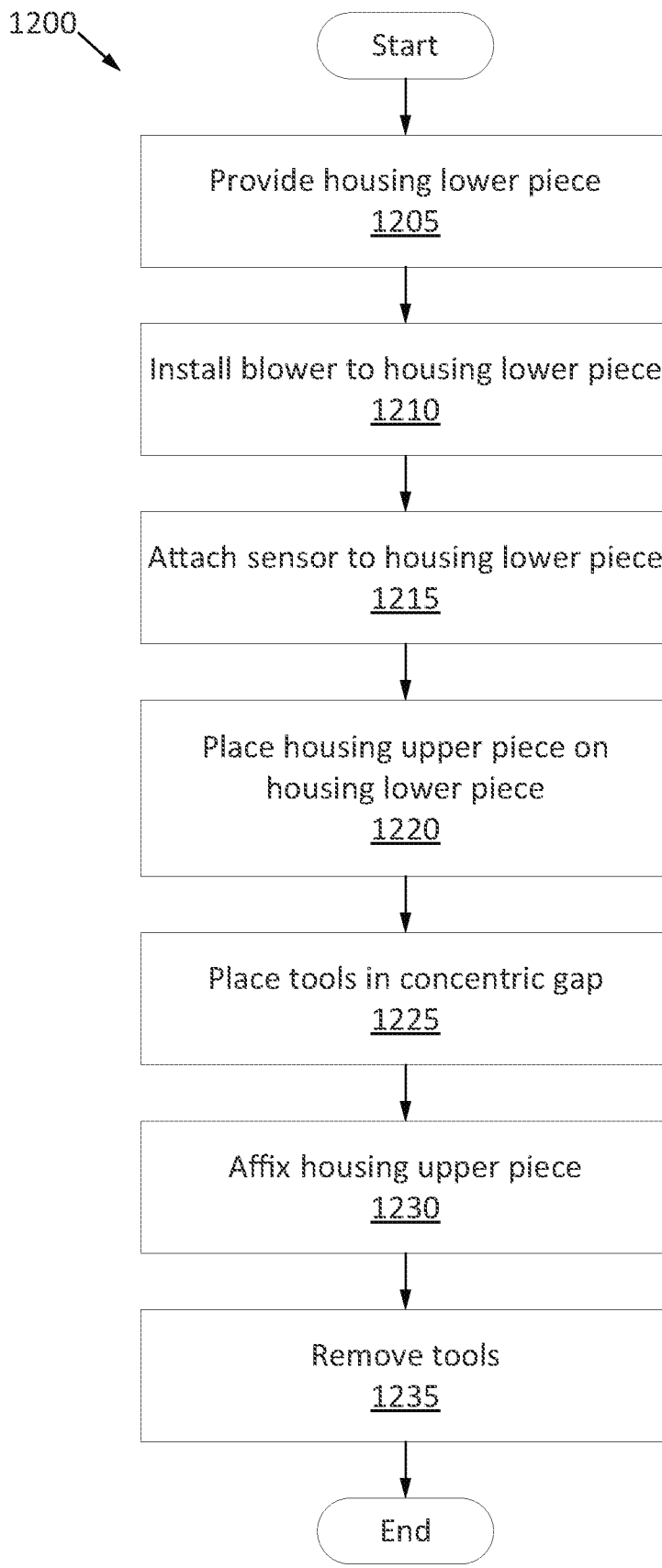
FIG. 12 is a process flow diagram of an example process for assembling the sensor assembly.

FIG. 12 is a process flow diagram for an exemplary process 1200 for assembling the sensor assembly 102. As a general overview of the process 1200, a technician can provide the housing lower piece 122, install the pressurized-air source 148 to the housing lower piece 122, attach the sensor 104 to the housing lower piece 122, place the housing upper piece 120 on the housing lower piece 122, fix the concentric gap 110 by placing the tools 112 in the concentric gap 110, affix the housing 106 while the tools 112 are in place, and remove the tools 112.

The process 1200 begins in a block 1205, in which the technician provides the housing lower piece 122. For example, the housing lower piece 122 can be mounted to the body 114 of the vehicle 100, e.g., to the roof 118 of the vehicle 100. The housing lower piece 122 can be already mounted to body 114 if, e.g., the sensor assembly 102 was previously assembled and then disassembled, such as for performing maintenance. For another example, the housing lower piece 122 can be secured in an assembly rig (not shown).

Next, in a block 1210, the technician installs the pressurized-air source 148, e.g., a blower, in the housing 106, e.g., on the housing lower piece 122. The pressurized-air source 148 may be, e.g., clipped or fastened to the housing lower piece 122.

Next, in a block 1215, the technician attaches the sensor 104 to the housing lower piece 122, e.g., to the platform 124. The sensor 104 may be, e.g., clipped or fastened to the housing lower piece 122. Attaching the sensor 104 before placing the housing upper piece 120 can provide better access for attaching the sensor 104.

Next, in a block 1220, the technician places the housing upper piece 120 on the housing lower piece 122 and inserts the sensor 104 through the port 108, as described above.

Next, in a block 1225, the technician fixes the concentric gap 110 between the port 108 and the sensor 104 by placing the tools 112 in the concentric gap 110, as described above with respect to FIGS. 8-11.

Next, in a block 1230, the technician affixes the housing 106, e.g., fastens the housing upper piece 120 to the housing lower piece 122, while the tools 112 are in place, as described above.

Next, in a block 1235, the technician removes the tools 112 from the concentric gap 110, as described above. Additionally, the technician can store the tools 112 inside the vehicle 100, e.g., in a compartment in the trunk or passenger cabin, as shown in FIG. 1. The partial cylindrical shape of the second portion 168 of the member 156 can permit the tools 112 to be stacked for storage, with the partial cylindrical portion 152 of a first tool 112 on top of the top panel 154 of a second tool 112 and the second portion 168 of the first tool 112 mating inside the partial cylindrical shape of the second portion 168 of the second tool 112. Stacking permits the tools 112 to occupy a small amount of space when stored inside the vehicle 100. After the block 1235, the process 1200 ends.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A method for assembling a sensor assembly, the sensor assembly including a cylindrical sensor and a housing, comprising:
    inserting the sensor through a circular port in the housing;
    fixing a concentric gap between the port and the sensor by placing a partially annular tool in the concentric gap;
    affixing the housing while the tool is in place; and
    removing the tool after affixing the housing.

2. The method of claim 1, wherein the housing includes a recess spaced from the port, and the tool includes a member that fits in the recess while the tool is placed in the concentric gap.

3. The method of claim 2, wherein the recess accommodates a fastener, and the affixing the housing includes fastening the fastener in the recess.

4. The method of claim 3, wherein the housing includes a housing lower piece and a housing upper piece, the housing upper piece includes the port and the recess, and the fastening the fastener in the recess attaches the housing upper piece to the housing lower piece.

5. The method of claim 4, further comprising, before the inserting the sensor through the port, attaching the sensor to the housing lower piece, wherein the inserting the sensor through the port includes placing the housing upper piece on the housing lower piece.

6. The method of claim 3, wherein the member has a partial cylindrical shape, and when the tool is placed in the gap, the partial cylindrical shape of the member is centered on an axis defined by the fastener.

7. The method of claim 6, wherein the recess has a partial cylindrical shape matching the partial cylindrical shape of the member.

8. The method of claim 7, wherein the recess includes a bottom panel including a hole for the fastener, and when the tool is placed in the concentric gap, the member is spaced from the bottom panel.

9. The method of claim 2, wherein the tool includes a partial cylindrical portion, and the member includes a first portion that extends radially outward from the partial cylindrical portion and a second portion that extends axially and fits in the recess when the tool is placed in the concentric gap.

10. The method of claim 1, wherein, after assembly, the sensor is rotatable relative to the housing around an axis defined by a cylindrical shape of the sensor.

11. The method of claim 1, wherein the tool has an arc length from 45° to 135°.

12. The method of claim 1, wherein the tool includes a partial cylindrical portion, and the placing the tool in the concentric gap includes placing the partial cylindrical portion in the concentric gap.

13. The method of claim 12, wherein the partial cylindrical portion includes a plurality of partial cylindrical extensions that are circumferentially spaced from each other.

14. The method of claim 12, wherein the tool includes at least one peg extending radially outward from the partial cylindrical portion, and the at least one peg axially abuts the port when the partial cylindrical portion is in the concentric gap.

15. The method of claim 14, wherein the at least one peg includes a plurality of pegs, the pegs extend radially outward from the partial cylindrical portion, and the pegs axially abut the port when the partial cylindrical portion is in the concentric gap.

16. The method of claim 12, wherein the tool includes a handle extending radially outward from the partial cylindrical portion, and the handle axially abuts the port when the partial cylindrical portion is in the concentric gap.

17. The method of claim 1, wherein the housing includes a gutter extending radially inward from the port, and the tool is spaced from a floor of the gutter when placed in the concentric gap.

18. The method of claim 1, wherein the tool is a first tool, and fixing the concentric gap includes placing a partially annular second tool in the concentric gap on an opposite side of the sensor as the first tool.

19. The method of claim 18, wherein the first tool and the second tool have identical shapes.

20. The method of claim 1, further comprising installing a blower in the housing, wherein the blower is positioned to generate airflow through the port.

* * * * *